(12) United States Patent
Lin et al.

(10) Patent No.: US 9,461,455 B2
(45) Date of Patent: Oct. 4, 2016

(54) PROTECTING CIRCUIT

(71) Applicant: ShenZhen Treasure City Technology Co., LTD., Shenzhen (CN)

(72) Inventors: Ching-Chung Lin, New Taipei (TW); Fu-Shan Cui, Shenzhen (CN)

(73) Assignee: ShenZhen Treasure Technology Co., LTD., ShenZhen (CN)

( * ) Notice: Subject to any disclaimer, the term of this patent is extended or adjusted under 35 U.S.C. 154(b) by 570 days.

(21) Appl. No.: 14/018,641

(22) Filed: Sep. 5, 2013

(65) Prior Publication Data

US 2014/0111899 A1    Apr. 24, 2014

(30) Foreign Application Priority Data

Oct. 19, 2012 (CN) .......................... 2012 1 0399542

(51) Int. Cl.
- *H02H 3/06* (2006.01)
- *H02H 3/08* (2006.01)
- *H02H 3/20* (2006.01)
- *H02H 3/027* (2006.01)

(52) U.S. Cl.
CPC ............... *H02H 3/08* (2013.01); *H02H 3/027* (2013.01); *H02H 3/066* (2013.01); *H02H 3/20* (2013.01)

(58) Field of Classification Search
USPC .......................................................... 361/93.4
See application file for complete search history.

(56) References Cited

U.S. PATENT DOCUMENTS

| | | | |
|---|---|---|---|
| 4,127,886 A * | 11/1978 | Easter | H02M 3/156 361/18 |
| 4,202,023 A * | 5/1980 | Sears | H02H 3/087 361/18 |
| 4,835,649 A * | 5/1989 | Salerno | H02H 3/087 323/276 |
| 5,457,591 A * | 10/1995 | Mock | H02H 3/08 361/18 |
| 8,278,997 B1 * | 10/2012 | Kim | G06F 1/26 327/541 |
| 2003/0197993 A1 * | 10/2003 | Mirowski | G06F 1/28 361/93.2 |
| 2006/0023383 A1 * | 2/2006 | Thiery | H02H 3/093 361/100 |
| 2006/0120007 A1 * | 6/2006 | Legatti | H01H 47/32 361/160 |
| 2008/0225455 A1 * | 9/2008 | Hartley | H02H 3/066 361/93.2 |
| 2009/0026977 A1 * | 1/2009 | Omi | H02M 1/36 315/294 |
| 2010/0013323 A1 * | 1/2010 | Chung | H02H 11/005 307/125 |
| 2010/0308655 A1 * | 12/2010 | Wachi | H02M 1/36 307/31 |
| 2012/0170165 A1 * | 7/2012 | Jung | H02H 1/06 361/86 |
| 2013/0021702 A1 * | 1/2013 | Waltman | H02H 3/34 361/91.1 |
| 2013/0082662 A1 * | 4/2013 | Carre | H02J 7/0052 320/134 |
| 2014/0111899 A1 * | 4/2014 | Lin | H02H 3/027 361/93.4 |

* cited by examiner

Primary Examiner — Ronald W Leja
(74) Attorney, Agent, or Firm — Zhigang Ma

(57) ABSTRACT

A protecting circuit connected between a power supply and a load includes an interface unit, a switching unit, a protection module, a locking unit, and a trigger unit. The interface unit is used for connecting to the load. The switching unit turns on to establish a connection between the power supply and the load when the interface connects to the load and turns off to cut off the connection. The protection module generates a protecting signal when the output of the power supply is in an abnormal state, and the locking unit controls the trigger unit to generate a control signal. The switching unit cuts off the connection in response to the control signal. When the output of the power supply resumes to a normal state, the switching unit automatically resumes the connection by reconnecting the interface with the load.

20 Claims, 2 Drawing Sheets

PROTECTING CIRCUIT

BACKGROUND

1. Technical Field

The present disclosure relates to a protecting circuit.

2. Description of Related Art

Electronic devices such as computers or fridges connected with an adapter, generally, include a fuse. The fuse melts and cuts off current paths in the electronic device for preventing elements in the electronic device from being damaged when the current of the electronic device exceeds a specific amperage, and the melted fuse cannot be reused. The cut-off path of the electronic device cannot be resumed until user manually replaces the melted fuse with a qualified fuse.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at "least one."

Figure 1:
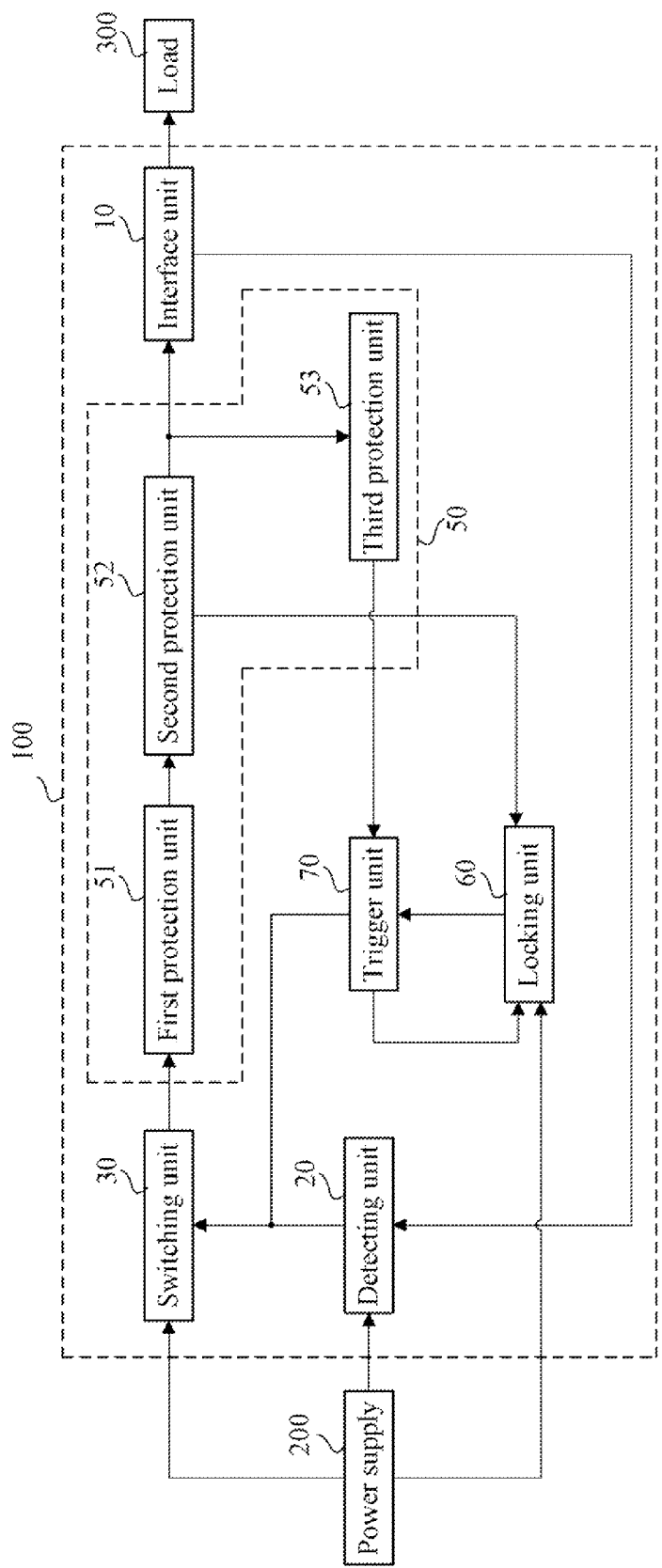
FIG. 1 is a block diagram of a protecting circuit in accordance with one embodiment.

FIG. 1 shows a protecting circuit 100 of one embodiment of the present disclosure. The protecting circuit 100 connects between a power supply 200 and a load 300, and includes an interface 10 for connecting with the load 300. The protecting circuit 100 cuts off a connection between the power supply 200 and the load 300 when the power supply 200 is in an abnormal state and resumes the connection by reconnecting the interface 10 with the load 300. The abnormal state can be abnormal current or voltage. The power supply 200 outputs a working voltage to the protecting circuit 100 when in a normal state. In the embodiment, the power supply 200 is an adapter, and the load 300 is a monitor; the working voltage is a constant voltage of 5V or 12V.

The protecting circuit 100 includes an interface unit 10, a detecting unit 20, a switching unit 30, a protection module 50, a locking unit 60, and a trigger unit 70.

The interface unit 10 connects to the load 300. In the embodiment, the interface unit 10 plugs into the load 300. In other embodiments, the interface unit 10 connects to the load 300 through a spring.

The detecting unit 20 connects between the power supply 200 and the interface unit 10. The detecting unit 20 detects whether the interface unit 10 connects with the load 300. The detecting unit 20 generates a detecting signal when the load 300 is inserted into the interface unit 10, and stops generating the detecting signal when the load 300 is disconnected from the interface unit 10.

The switching unit 30 connects between the power supply 200 and the protection module 50. The switching unit 30 turns on to establish a connection between the power supply 200 and the protection module 50 in response to the detecting signal, and turns off to cut off the connection if not receiving the detecting signal.

The protection module 50 connects between the interface unit 10 and the switching unit 30. The protection module 50 generates a protecting signal to the locking unit 60 when the power supply 200 is in the abnormal state. The protection module 50 includes a first protection unit 51, a second protection unit 52, and a third protecting unit 53. The first protecting unit and the second protecting unit 52 connect between the interface unit 10 and the switching unit 30 in series. The third protecting unit 53 connects to the second protection unit 52, the locking unit 60, and the trigger unit 70.

The first protection unit 51 outputs a limited current in a predetermined period from the time point when the switching unit 30 turns on, and directly outputs the current from the power supply 200 after the predetermined period. In the embodiment, the first protection unit 51 protects the load 300 if the power supply 200 is in the abnormal current state when in the first predetermined period.

The second protection unit 52 is disabled in the first predetermined time, and is enabled after the first predetermined time. When being enabled, the second protection unit 52 generates a first protecting signal when the received current is larger than a predetermined value and stops generating the first protecting signal when the received current is not larger than the predetermined value. In the embodiment, the second protection unit 52 protects the load 300 from being damaged when the power supply 200 is in the abnormal current state after the first predetermined time period.

The third protection unit 53 generates a second protecting signal to the trigger unit 70 when the voltage of the second protection unit 52 is more than a first predetermined voltage or less than a second predetermined voltage, and stops generating the second protecting signal to the trigger unit 70 when the voltage of the second protection unit 52 is between the first predetermined voltage and the second predetermined voltage. In the embodiment, the second predetermined voltage is less than the first predetermined voltage, and the second protecting signal is a logic high level voltage signal; the third protection unit 53 protects the load 300 from being damaged while the power supply 200 is in the abnormal voltage state.

The locking unit 60 connects to the power supply 200, the second protecting unit 52, and the trigger unit 70. The locking unit 60 is powered by the working voltage of the power supply 200 and controls the trigger module 70 to output a control signal to the switching unit 30 and a feedback signal to the locking unit 60 in response to the first or the second protecting signal. The locking unit 60 further controls the trigger module 70 to keep outputting the control signal in response to the feedback signal.

The switching module 30 further cuts off the connection between the power supply 200 and the first protection unit 51 in response to the control signal.

In the embodiment, the locking unit 60 locks the switching unit 30 in a turn-off state when the power supply 200 is in the abnormal state, such as the over-current state, the over-voltage state, or the low-voltage state, for example. The protecting circuit 100 can resume the connection between the power supply 200 and the load 300 through turning on the switching unit 30, the manner for turning on the switching unit 30 can be adopted to reconnect the interface unit 10 with the load 300. For example, the user can press a button which is connected to the protecting circuit 100 to turn on the switching unit 30.

Figure 2:
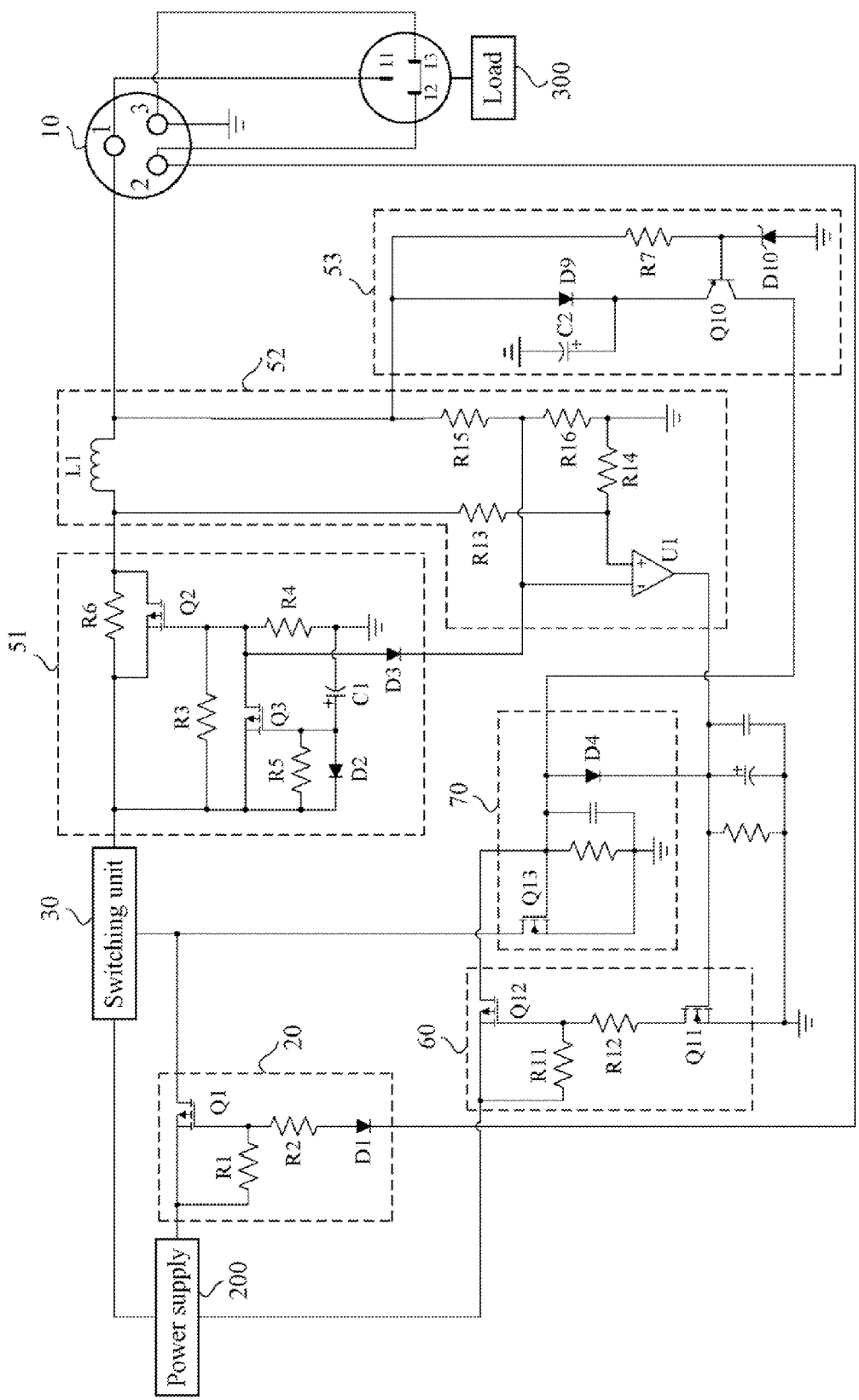
FIG. 2 is a circuit diagram of the protecting circuit of FIG. 1 in accordance with one embodiment.

FIG. 2 shows that the interface unit 10 includes a first socket 1, a second socket 2, and a third socket 3 which are insulated from each other. The first socket 1 connects to the power supply 200 through the second protection unit 52, the first protection unit 51, and the switching unit 30. The third socket 3 is grounded.

The detecting unit 20 includes a first resistor R1, a second resistor R2, a first transistor Q1, and a first diode D1. A gate of the first transistor Q1 is connected to the second socket 2 through the second resistor R2, and the first diode D1. A source of the first transistor Q1 is connected to the power supply 200. A drain of the transistor Q1 is connected to the switching unit 30. Opposite terminals of the first resistor R1 are connected between the gate and the source of the first transistor Q1 correspondingly. An anode of the first diode D1 is connected to the gate of the transistor Q1 through the second resistor R2. A cathode of the first diode is connected to the second socket 2. In the embodiment, the first transistor Q1 is a p-channel enhancement type metal oxide semiconductor field effect transistor (MOSFET).

The first protection unit 51 includes a first capacitor C1, a second transistor Q2, a third transistor Q3, a second diode D2, a third diode D3, a first limiting resistor R3, a second limiting resistor R4, a third limiting resistor R5, and a fourth limiting resistor R6. A gate of the second transistor Q2 is grounded through the second limiting resistor R3. A source of the second transistor Q2 is connected to the switching unit 30. A drain of the second transistor Q3 is connected to the second protection unit 52. Opposite terminals of the first limiting resistor R3 are connected to the source and the gate of the second transistor Q2 correspondingly. Opposite terminals of the third limiting resistor R6 are connected to the source and the drain of the second transistor Q2 correspondingly. A gate of the third transistor Q3 is grounded through the first capacitor C1. A source of the third transistor Q3 is connected to the source of the second transistor Q2. A drain of the third transistor Q3 is connected to the source of the second transistor Q2. An anode of the second diode D2 is connected to the gate of the third transistor Q3. A cathode of the second diode D2 is connected to the source of the second transistor Q2. An anode of the third diode D3 is connected to the gate of the second transistor Q2. A cathode of the third diode D3 is connected to the second protection unit 52. An anode of the first capacitor C1 is connected to the gate of the third transistor Q3. A cathode of the first capacitor C1 is grounded. In the embodiment, the second transistor Q2 and the third transistor Q3 are p-channel enhancement type MOSFETs; the first capacitor C1 is an electrolytic capacitor.

The second protection unit 52 includes an inductor L1, a comparator U1, a first divider resistor R13, a second divider resistor R14, a third divider resistor R15, and a fourth divider resistor R16. Opposite terminals of the inductor L1 are connected to the drain of the second transistor Q2 and the first socket 1 correspondingly. The first divider resistor R13 and the second divider resistor R14 are connected between the drain of the second transistor Q2 and the ground in series. The third divider resistor R15 and the fourth divider resistor R16 are connected between the first socket 1 and the ground in series. A non-inverting input of the comparator U1 is connected between the first divider resistor R13 and the second divider resistor R14. An inverting input of the comparator U1 is connected between the third divider resistor R15 and the fourth divider resistor R16. An output of the comparator U1 is connected to the locking unit 60. The cathode of the third diode D3 is connected to the inverting input of the comparator U1.

The third protection unit 53 includes a protecting transistor Q10, a second capacitor C2, a first protecting diode D9, a second protecting diode D10, and a pull-up resistor R7. The pull-up resistor R7 and the second protecting diode D10 are connected between the first socket 1 and the ground in series. A base of the protecting transistor Q10 is connected between the pull-up resistor R7 and the second protecting diode D10. An emitter of the protecting transistor Q10 is connected to the first socket 1 through the first protecting diode D9. A collector of the protecting transistor Q10 is connected to the trigger unit 70. An anode of the second protecting diode D10 is grounded. A cathode of the second protecting diode D10 is connected to the first socket 1 through the pull-up resistor R7. An anode of the second capacitor C2 is connected between the cathode of the first protecting diode D9 and the emitter of the protecting transistor Q10. A cathode of the second capacitor C2 is grounded. In the embodiment, the protecting transistor Q10 is a pnp type bipolar junction transistor; the second capacitor C2 is an electrolytic capacitor; the second protecting D10 is a zener diode.

The locking unit 60 includes a fourth transistor Q11, a fifth transistor Q12, a third resistor R11, and a fourth resistor R12. A gate of the fourth transistor Q11 is connected to the output of the comparator U1. A source of the fourth transistor Q11 is grounded. A drain of the fourth transistor Q11 is connected to the power supply 200 through the third resistor R11 and the fourth resistor R12. A gate of the fifth transistor Q12 is connected between the third resistor R11 and the fourth resistor R12. A source of the fifth transistor Q12 is connected to the power supply 200. A drain of the fifth transistor Q12 is connected to the trigger unit 70. In the embodiment, the fourth transistor Q11 is an n-channel enhancement type MOSFET, and the fifth transistor Q12 is a p-channel enhancement type MOSFET.

The trigger unit 70 includes a sixth transistor Q13 and a fourth diode D4. A gate of the sixth transistor Q13 is connected to the collector of the protecting transistor Q10. A source of the sixth transistor Q13 is grounded. A drain of the sixth transistor Q13 is connected to the switching unit 30. The drain of the fifth transistor Q12 is connected to the gate of the sixth transistor Q13. An anode of the fourth diode D4 is connected to the gate of the sixth transistor Q13. A cathode of the fourth diode D4 is connected to the output of the comparator U1. In the embodiment, the sixth transistor Q13 is an n-channel enhancement type MOSFET.

The load 300 includes a first plug 11, a second plug 12, and a third plug 13. The second plug 12 connects with the third plug 13.

The principal of the protecting circuit 300 is described, when the interface unit 10 plugs into the load 300, the first plug 11 connects with the first socket 1, the second plug 12 connects with the second socket 2, and the third plug 13 connects with the third socket 3. The voltage difference between the source and the gate of the first transistor Q1 is more than 0V, the first transistor Q1 turns on and generates working voltage to the switching unit 30. The switching unit 30 turns on based on the working voltage from the power supply 200.

The voltage difference between the source and the gate of the third transistor Q3 is more than 0V, the third transistor Q3 turns on. The voltage of the first capacitor C1 is charged gradually by the power supply 200. The voltage difference between the anode and the cathode of the third diode D3 is more than 0.3V, the third diode D3 turns on. The voltage difference between the non-inverting input and the inverting input of the comparator U1 is more than 0V, the output of the comparator U1 outputs a logic low level signal, thus the second protection unit 52 is disable to generating a second protecting signal. The voltage difference between the source and the gate of the second transistor Q2 is less than 0V, the second transistor Q2 turns off. The current from the power supply 200 passes to the inductor L1 through the fourth limiting resistor R6, and is reduced by the fourth limiting resistor R6. After the first predetermined period, the first capacitor C1 is completely charged. The voltage difference between the source and the gate of the third transistor Q3 is less than 0V, the third transistor Q3 turns off. The voltage difference between the source and the gate of the second transistor Q2 is more than 0V, the second transistor Q2 turns on. The resistance of the second transistor Q2 is less than the resistance of the fourth limiting resistor R6, the current of the power supply 200 passes to the inductor L1 through the second transistor Q2.

When the predetermined period is passed, the voltage difference between the anode and the cathode of the third diode D3 is less than 0.3V, the third diode D3 turns off. The comparator U1 is enabled to work based on the current passing through the inductor L1. When the current passing the inductor L1 is less than the predetermined value, the voltage difference between the non-inverting input and the inverting of the comparator U1 is more than 0V, thus the output of the comparator U1 outputs a logic low level signal. The voltage difference between the gate and the source of the fourth transistor Q11 is less then 0V, the fourth transistor Q11 turns off. When the current passing through the inductor L1 is more than the predetermined value, the voltage difference between the non-inverting input and the inverting input of the comparator U1 is less than 0V, thus the output of the comparator U1 outputs the second protecting signal. The voltage difference between the gate and the source of the fourth transistor Q11 is more than 0V, the fourth transistor Q11 turns on. The voltage difference between the source and the gate of the fifth transistor Q12 is more than 0V, thus the fifth transistor Q12 turns on. The voltage difference between the gate and the source of the sixth transistor Q13 is more than 0V, thus the sixth transistor Q13 turns on. The drain of the sixth transistor Q13 outputs the control signal to the switching unit 30. The switching unit 30 cuts off the connection between the power supply 200 and the first protection 51. The voltage difference between the anode and the cathode of the fourth diode D4 is more than 0.3V, the fourth diode D4 turns on to generate the second protecting signal to the base of the fourth transistor Q11. The fourth transistor Q11 stays on. Thus, the switching unit 30 locks in the turn-off state.

When the received voltage of the third protection unit 53 is more than the first predetermined voltage or the received voltage of the third protection unit 53 is less than the second predetermined voltage, the voltage difference between the emitter and the base of the protecting transistor Q10 is more than 0V, the protecting transistor Q10 turns on. The voltage difference between the emitter and the base of the protecting transistor Q10 is more than 0V, the protecting transistor Q10 turns on. The emitter of the protecting transistor Q10 generates a first protecting signal to the gate of the sixth transistor Q13. The voltage difference between the gate and the source of the sixth transistor Q13 is more than 0V, thus the sixth transistor Q13 turns on. The drain of the sixth transistor Q13 outputs the control signal to the switching unit 30. The switching unit 30 cuts off the connection between the power supply 200 and the first protection 51. The voltage difference between the anode and the cathode of the fourth diode D4 is more than 0.3V, the fourth diode D4 turns on to generate the second protecting signal to the base of the fourth transistor Q11. The fourth transistor Q11 stays on. Thus, the switching unit 30 locks in the turn-off state. Further, when the received voltage of the third protection unit 53 is more than the first predetermined voltage, the second protecting diode D10 is in a reverse breakdown state to pull down the voltage at the base of the sixth transistor Q13.

By utilizing the present disclosure, the protecting circuit 100 automatically resumes the connection between the power supply 200 and the load 300 by reconnecting the interface unit 10 with the load 300. Therefore, there is no need for user to manually replace any elements of the protecting circuit 100.

It is to be understood, however, that even though information and advantages of the present embodiments have been set forth in the foregoing description, together with details of the structures and functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A protecting circuit connected between a power supply and a load, comprising:
   an interface unit for connecting to the load;
   a switching unit for turning on to establish a connection between the power supply and the load when the interface connecting to the load and turning off to cut off the connection; and
   a protection module connected between the switching unit and the load;
   a locking unit connected to the power supply and the protection module; and
   a trigger unit connected between the switching unit and the locking unit;
   wherein the protection module generates a protecting signal when the output of the power supply is in a abnormal state, and the locking unit controls the trigger unit to generate a control signal; the switching unit cuts off the connection in response to the control signal; the switching unit automatically resumes the connection by reconnecting the power supply with the load.

2. The protecting circuit of claim 1, wherein the trigger unit further generates a feedback signal while generating the control signal; the locking unit further controls the trigger module to keep outputting the control signal in response to the feedback signal.

3. The protecting circuit of claim 1, wherein the locking unit comprises a first transistor, a second transistor, a first resistor, and a second resistor; a gate of the first transistor is connected to the protection module; a source of the first transistor is grounded; a drain of the first transistor is connected to the power supply through the first resistor and the second resistor; a gate of the second transistor is connected between the first resistor and the second resistor; a source of the second transistor is connected to the power supply; a drain of the second transistor is connected to the trigger unit.

4. The protecting circuit of claim 1, wherein the trigger unit comprises a third transistor and a first diode; a gate of the third transistor is connected to the protection module; a source of the third transistor is grounded; a drain of the third transistor is connected to the switching unit; an anode of the fourth diode is connected to the gate of the third transistor; a cathode of the fourth diode is connected to the protection module.

5. The protecting circuit of claim 1, wherein the protection module comprise a first protection unit and a second protection unit; the first protection unit and the second connect between the interface unit and the switching unit in series; the first protection unit outputs a limited current in a predetermined period from the time point when the switching unit turns on and directly outputs the current from the power supply after the predetermined period; the second protection unit is disabled in the first predetermined time, and is enabled after the first predetermined time; when being enabled the second protection unit generates a first protecting signal when the current of the power supply is larger than a predetermined value and stops generating the first protect signal when the current of the power supply is not larger than the predetermined value.

6. The protecting circuit of claim 5, wherein the protection module further comprises a third protection unit; the third protection unit generates a second protecting signal to the trigger unit when the voltage of the second protection unit is more than a first predetermined voltage or less than a second predetermined voltage, and the third protection unit stops generating the second protecting signal to the trigger unit when the voltage of the second protection unit is between the first predetermined voltage and the second predetermined voltage; the first predetermined voltage is larger than the second predetermined voltage.

7. The protecting circuit of claim 5, wherein the first protection unit comprises a first capacitor, a fourth transistor, a fifth transistor, a second diode, a third diode, a first limiting resistor, a second limiting resistor, a third limiting resistor, and a fourth limiting resistor; a gate of the fourth transistor is grounded through the second limiting resistor; a source of the fourth transistor is connected to the switching unit; a drain of the fourth transistor is connected to the second protection unit; opposite terminals of the first limiting resistor are connected to the source and the gate of the fourth transistor correspondingly; opposite terminals of the third limiting resistor are connected to the source and the drain of the fourth transistor correspondingly; a gate of the fifth transistor is grounded through the first capacitor; a source of the fifth transistor is connected to the source of the fourth transistor; a drain of the fifth transistor is connected to the source of the fourth transistor; an anode of the second diode is connected to the gate of the fifth transistor; a cathode of the second diode is connected to the source of the fourth transistor; an anode of the third diode is connected to the gate of the fourth transistor; a cathode of the third diode is connected to the second protection unit; an anode of the first capacitor is connected to the gate of the fifth transistor; a cathode of the first capacitor is grounded.

8. The protecting circuit of claim 5, wherein the second protecting unit comprises an inductor, a comparator, a first divider resistor, a second divider resistor, a third divider resistor, and a fourth divider resistor; opposite terminals of the inductor are connected to first protection unit and the interface unit correspondingly; the first divider resistor and the second divider resistor are connected between the first protection unit and the ground in series; the third divider resistor and the fourth divider resistor are connected between the interface unit and the ground in series; a non-inverting input of the comparator is connected between the first divider resistor and the second divider resistor; an inverting input of the comparator is connected between the third divider resistor and the fourth divider resistor; an output of the comparator is connected to the locking unit.

9. The protecting circuit of claim 6, wherein the third protection unit a protecting transistor, a second capacitor, a first protecting diode, a second protecting diode, and a pull-up resistor; the pull-up resistor and the second protecting diode are connected between the interface unit and the ground in series; a base of the protecting transistor is connected between the pull-up resistor and the second protecting diode; an emitter of the protecting transistor is connected to the interface unit through the first protecting diode; a collector of the protecting transistor is connected to the trigger unit; an anode of the second protecting diode is grounded; a cathode of the second protecting diode is connected to the interface unit through the pull-up resistor; an anode of the second capacitor is connected between the cathode of the first protecting diode and the emitter of the protecting transistor; a cathode of the second capacitor is grounded.

10. The protecting circuit of claim 1, further comprising a detecting unit, wherein the detecting unit detects whether the interface unit connects with the load and generates a detecting signal when the interface unit connects with the load; the switching unit turns on for establishing the connection between the power supply and the load in response to the detecting signal.

11. A protecting circuit connected between a power supply and a load, comprising:
    an interface unit for connecting to the load;
    a switching unit for turning on to establish a connection between the power supply and the load when the interface connecting to the load and to turn off to cut off the connection; and
    a protection module connected between the switching unit and the load;
    a locking unit connected to the power supply and the protection module; and
    a trigger unit connected between the switching unit and the locking unit;
    wherein the protection module generates a protecting signal when the output of the power supply is in an abnormal state, and the locking unit controls the trigger unit to generate a control signal; the switching unit cuts off the connection in response to the control signal; the trigger unit further generates a feedback signal while generating the control signal; the locking unit further controls the trigger module to keep outputting the control signal in response to the feedback signal.

12. The protecting circuit of claim 11, wherein the protection module comprise a first protection unit; the first protection unit connects between the switching unit and the interface unit; the first protection unit outputs a limited current in a predetermined period from the time point when the switching unit turns on and directly outputs the current from the power supply after the predetermined period.

13. The protecting circuit of claim 12, wherein the protection module further comprises a second protection unit; the second connects between the first protection unit and the interface unit; the second protection unit is disabled in the first predetermined time, and the second protection unit is enabled after the first predetermined time; when being enabled the second protection unit generates a first protecting signal when the current of the power supply is larger than a predetermined value and stops generating the first protect signal when the current of the power supply is not larger than the predetermined value.

14. The protecting circuit of claim 12, wherein the protection module further comprises a third protection unit; the third protection unit generates a second protecting signal to the trigger unit when the voltage of the interface unit is more than a first predetermined voltage or less than a second predetermined voltage, and the third protection unit stops generating the second protecting signal to the trigger unit when the voltage of the second protection unit is between the first predetermined voltage and the second predetermined voltage; the first predetermined voltage is larger than the second predetermined voltage.

15. The protecting circuit of claim 11, wherein the locking unit comprises a first transistor, a second transistor, a first resistor, and a second resistor; a gate of the first transistor is connected to the protection module; a source of the first transistor is grounded; a drain of the first transistor is connected to the power supply through the first resistor and the second resistor; a gate of the second transistor is connected between the first resistor and the second resistor; a source of the second transistor is connected to the power supply; a drain of the second transistor is connected to the trigger unit.

16. The protecting circuit of claim 11, wherein the trigger unit comprises a third transistor and a first diode; a gate of the third transistor is connected to the protection module; a source of the third transistor is grounded; a drain of the third transistor is connected to the switching unit; an anode of the fourth diode is connected to the gate of the third transistor; a cathode of the fourth diode is connected to the protection module.

17. The protecting circuit of claim 12, wherein the first protection unit comprises a first capacitor, a fourth transistor, a fifth transistor, a second diode, a third diode, a first limiting resistor, a second limiting resistor, a third limiting resistor, and a fourth limiting resistor; a gate of the fourth transistor is grounded through the second limiting resistor; a source of the fourth transistor is connected to the switching unit; a drain of the fourth transistor is connected to the second protection unit; opposite terminals of the first limiting resistor are connected to the source and the gate of the fourth transistor correspondingly; opposite terminals of the third limiting resistor are connected to the source and the drain of the fourth transistor correspondingly; a gate of the fifth transistor is grounded through the first capacitor; a source of the fifth transistor is connected to the source of the fourth transistor; a drain of the fifth transistor is connected to the source of the fourth transistor; an anode of the second diode is connected to the gate of the fifth transistor; a cathode of the second diode is connected to the source of the fourth transistor; an anode of the third diode is connected to the gate of the fourth transistor; a cathode of the third diode is connected to the second protection unit; an anode of the first capacitor is connected to the gate of the fifth transistor; a cathode of the first capacitor is grounded.

18. The protecting circuit of claim 13, wherein the second protecting unit comprises an inductor, a comparator, a first divider resistor, a second divider resistor, a third divider resistor, and a fourth divider resistor; opposite terminals of the inductor are connected between first protection unit and the interface unit; the first divider resistor and the second divider resistor are connected between the first protection unit and the ground in series; the third divider resistor and the fourth divider resistor are connected between the interface unit and the ground in series; a non-inverting input of the comparator is connected between the first divider resistor and the second divider resistor; an inverting input of the comparator is connected between the third divider resistor and the fourth divider resistor; an output of the comparator is connected to the locking unit.

19. The protecting circuit of claim 14, wherein the third protection unit a protecting transistor, a second capacitor, a first protecting diode, a second protecting diode, and a pull-up resistor; the pull-up resistor and the second protecting diode are connected between the interface unit and the ground in series; a base of the protecting transistor is connected between the pull-up resistor and the second protecting diode; an emitter of the protecting transistor is connected to the interface unit through the first protecting diode; a collector of the protecting transistor is connected to the trigger unit; an anode of the second protecting diode is grounded; a cathode of the second protecting diode is connected to the interface unit through the pull-up resistor; an anode of the second capacitor is connected between the cathode of the first protecting diode and the emitter of the protecting transistor; a cathode of the second capacitor is grounded.

20. The protecting circuit of claim 11, wherein the switching unit automatically turns on for resuming the connection by reconnecting the interface with the load.

\* \* \* \* \*